United States Patent [19]

Kaplan et al.

[11] 3,993,908
[45] Nov. 23, 1976

[54] SYSTEM FOR WHOLE BODY IMAGING AND COUNT PROFILING WITH A SCINTILLATION CAMERA

[76] Inventors: Ervin Kaplan, 2600 Wilmette Ave., Wilmette, Ill. 60091; Michael B. D. Cooke, 13, Southeast Avenue, Bishopbriggs, Glasgow G64 3AB, Scotland

[22] Filed: June 3, 1974

[21] Appl. No.: 475,438

Related U.S. Application Data

[62] Division of Ser. No. 372,835, June 22, 1973, Pat. No. 3,839,641.

[52] U.S. Cl. .............................. 250/363 S; 250/364
[51] Int. Cl.² ......................................... G01T 1/166
[58] Field of Search ................ 250/366, 369, 363 S

[56] References Cited
UNITED STATES PATENTS

3,839,641   10/1974   Cooke et al. ...................... 250/369

Primary Examiner—Archie R. Borchelt
Attorney, Agent, or Firm—Prangley, Dithmar, Vogel, Sandler & Stotland

[57] ABSTRACT

The present invention relates to a method of and apparatus for the radionuclide imaging of the whole body of a patient using an unmodified scintillation camera which permits a patient to be continuously moved under or over the stationary camera face along one axis at a time, parallel passes being made to increase the dimension of the other axis. The system includes a unique electrical circuit which makes it possible to digitally generate new matrix coordinates by summing the coordinates of a first fixed reference frame and the coordinates of a second moving reference frame.

19 Claims, 7 Drawing Figures

SYSTEM FOR WHOLE BODY IMAGING AND COUNT PROFILING WITH A SCINTILLATION CAMERA

This is an divisional application of our copending application Ser. No. 372,835, filed June 22, 1973, for SYSTEM FOR WHOLE BODY IMAGING & COUNT PROFILING WITH A SCINTILLATION CAMERA, now U.S. Pat. No. 3,839,641, issued Oct. 1, 1974.

FIELD OF THE INVENTION

The present invention relates to a method of and apparatus for the radionuclide imaging of the whole body of a patient using an unmodified scintillation camera.

BACKGROUND OF THE INVENTION

Prior art systems for the generation of an image of an extended area operate in one of two ways. One method consists of synchronizing the movement of a photographic film across the face of the display oscilloscope with the movement of the camera detector head in front of the patient, the only record being the orginial photograph.

The other method consists of scanning radiation detection apparatus including a scintillation detector mounted for linear movement in opposite directions along a carriage. The carriage is itself mounted for linear movement in opposite directions orthogonal to the directions of movement of the scintillation detector, specific means being provided for moving the scintillation detector at a constant scanning speed and for reversing its direction at the end of each scan.

The major problem with these prior art methods is that they necessitate extensive and costly camera modifications due to the mobile character of the camera. Furthrmore, in the first method because the original photograph is the only record, there is no provision for data storage.

SUMMARY OF THE INVENTION

An object of the present invention is to overcome the defects of the prior art, such as indicated above.

Another object is to provide whole body radionuclide imaging by a stationary unmodified scintillation camera.

Another object is to provide a system whereby the full recording and processing facilities of a commonly available scintillation camera may be employed for storage, processing and display of images up to whole body size.

A further object is to provide a system for whole body imaging which may be used in rountine clinical studies.

Yet another object is to provide whole body images with improved uniformity and the same degree of resolution as normal localized images.

In furtherance of these and other objects, a principal feature of the present invention is a scanning imager that operates on a digital concept by which X and Y components of a fixed reference frame are cumulatively added to the X and Y components of a moving reference frame with the resultant digital readout being multiplexed onto video tape. Another feature is the electronic synchronization between the patient carrying table and the fixed scintillation camera. A further feature is that the image producing area of the circular camera crystal is masked to a rectangular shape electronically rather than by collimation.

Thus the shortcomings of prior art radiation scanning devices are satisfactorily overcome by the instant invention.

The system of the present invention is characterized by scanning table which permits a patient to be continuously moved under or over the camera crystal along one axis at a time, parallel passes being made to increase the dimension of the other axis, in such a manner that all parts of the body are exposed to some part of the camera crystal for an equal length of time. A unique electrical circuit allows the camera coordinates of a particular image point and the simultaneous relative position of the camera and patient to be recorded and digitally summed before display.

For a better understanding of the invention a particular embodiment thereof will now be described with reference to the attached drawing, it being understood, that this is to be intended as merely exemplary and in no way limitative.

DESCRIPTION OF PREFERRED EMBODIMENTS

Figure 1:
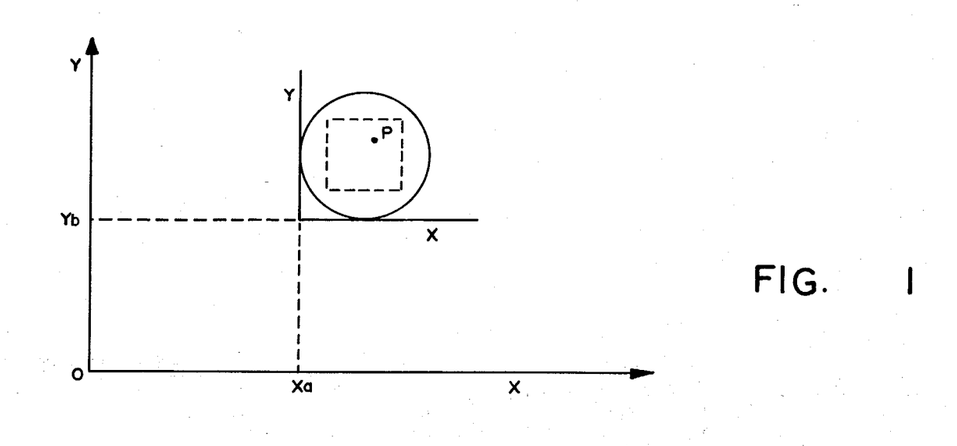
FIG. 1 is a graph showing the relationship between the stationary camera coordinate reference frame $(x\ y)$ and the moving object coordinate reference frame $(X\ Y)$.

The principle whereby an image of an extended object can be formed is illustrated in FIG. 1. FIG. 1 shows two frames of reference, the camera reference frame x y and the object reference frame X y. These represent the circular camera crystal and the patient respectively. In the usual static mode of imaging, there is a 1:1 relationship between the occurrence of a disintegration in the object and the production of a scintillation event at any point such as P in the crystal. The size of the object field which can be imaged is restricted to the size of the crystal used.

In the Dynacamera, a typical commercially available scintillation camera, the object field is digitized in the image presentation such that each point in the image can be represented by two 7-bit binary numbers. The full usable crystal diameter of 30 cm. is represented by 100 image points, thus the separation of each image point corresponds to 3 mm. in the object. The circular image is displayed on the faces of a persistence oscilloscope for monitoring and of a second oscilloscope from which a photographic image is produced by integration of all events occurring during exposure.

The orgin of the camera frame of reference may be considered to have coordinates relative to some fixed point which is the origin of the object frame of reference. Let these coordinates be $X_a Y_b$ in the first quadrant of the object frame where both $X_a$ and $Y_b$ are integral multiples of 3 mm. An event occuring at P has matrix coordinates $x_i y_j$ in the camera reference frame but this point can also be given new matrix coordinates $$(X_a + x_i) (Y_b + y_j)$$

in the object reference frame. These may be written $X_i Y_j$. Relative movement of the camera and patient can therefore by used to generate a new much larger image matrix if both the camera coordinates of a scintillation event and the simultaneous relative position of camera and patient are recorded and then summed before display. Therefore, an anterior or posterior view of a 1.8m. (6 foot) patient whose maximum width is 54 cm. (21 inches) can be imaged in a matrix of 600 × 180 points.

The hardware required to generate the image is identical in every case. The basic requirements are that the patient be moved above or below the detector head of a scintillation camera in such a way that his position at any time may be expressed as the two coordinates $X_a$ and $Y_b$ and that all parts of the body are exposed to some part of the detector crystal for an equal length of time.

Figure 2:
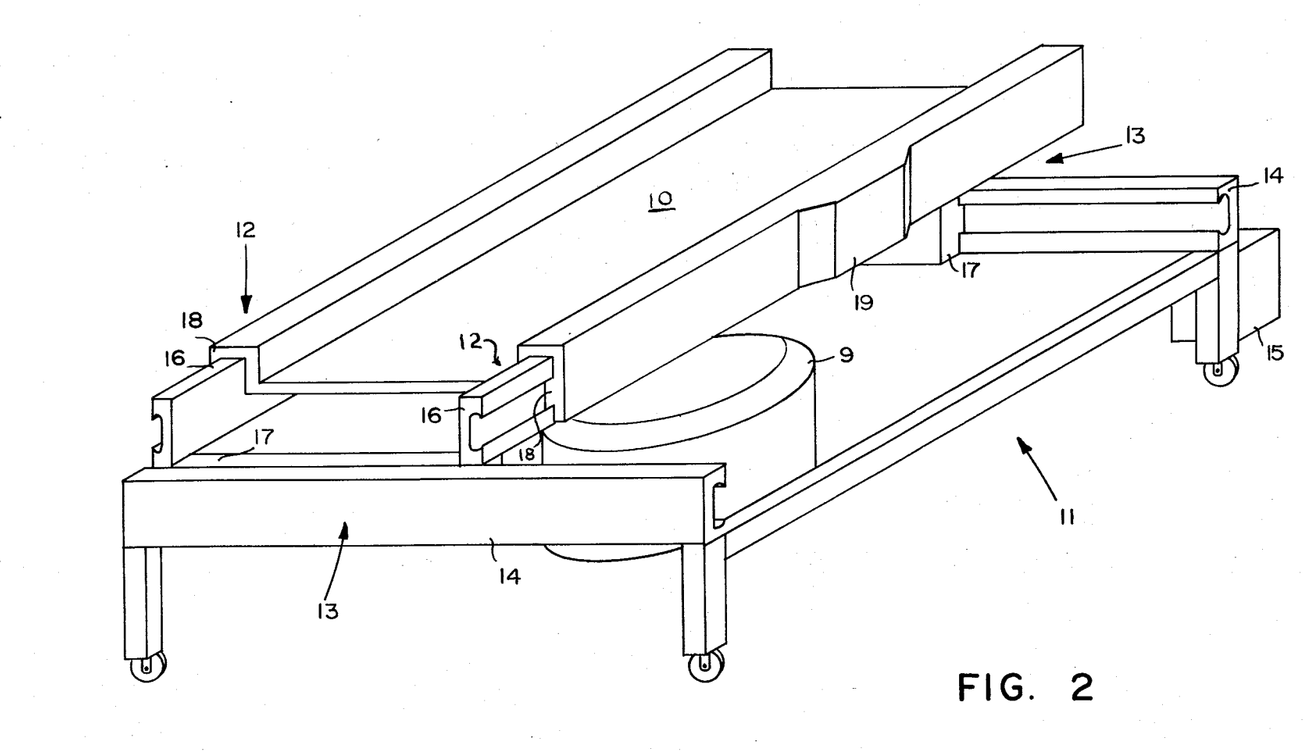
FIG. 2 shows the scanning table with the scintillation camera located beneath the table.

Referring now to FIG. 2, patient size determines the dimensions of the scanning table and the extension of the drive mechanism. In addition, the requirement that the detector head may be placed below the patient with a minumum patient to detector separation imposes stringent limitations on the size and location of the drive mechanism to eliminate the possibility of interference with the detector head.

The table surface 10 the patient is slidably mounted in two directions on the table frame, denoted generally by 11, by a set of longitudinal slides 12, 12 and a set of transverse slides 13, 13. Each slide comprises an inner and outer member separated by two captive ball slides.

The outer members 14, 14 of the transverse or Y slides are attached to the table frame 11 as is the Y drive motor 15. The inner member of the Y slides at each end of the table carries a millimeter gear track. At one end of the table the millimeter gear track is driven directly by the DC drive motor 15 while positive drive to the millimeter gear track at the opposite end is provided by a shaft and chain coupling. The double drive mechanism sufficiently eliminates any skewing between the widely separated table ends.

The inner members 16, 16 of the longitudinal or X slides are fastened to the inner members 17, 17 of the Y slides, thereby transmitting transverse motion to the X slides.

In other words, the outer members 14, 14 are of the Y slides maintain a fixed position and are not subject to either longitudinal or transverse displacement in relation to the stationary camera detector head 9. The inner members 17, 17 of the Y slides may be transversely displaced in relation to the outer members of the Y slides by the millimeter gear track and the Y drive motor. Since the inner members 16, 16 of the X slides are fastened to the inner members 17, 17 of the Y slides they also may be transversely displaced. However, neither the inner members of the X or Y slides may be longitudinally displaced. The outer members 18, 18 of the X slides may be longitudinally displaced by the millimeter gear track mounted on the inner X slide members and the X drive motor 19, and transversely displaced since the outer X slide members occupy a fixed transverse position with respect to the inner members of the X slides which are subject to transverse displacement as discussed above. Similarly, the table surface 10 is also capable of transverse and longitudinal displacement since it is mounted between the two outer members 18, 18 of the X slides which also carry the X-drive motor 19.

The table surface 10 may consist of 3/8 inch thick Masonite or any other similar material to provide a low scatter, low cost support when the detector head 9 is positioned below the patient. In this position the trough shape (see FIGS. 2 and 5) enables the detector head to be placed within 3 cm. (1-¼ inch) of the upper surface of the table. Some redesign would enable this to be further reduced.

Figure 3:
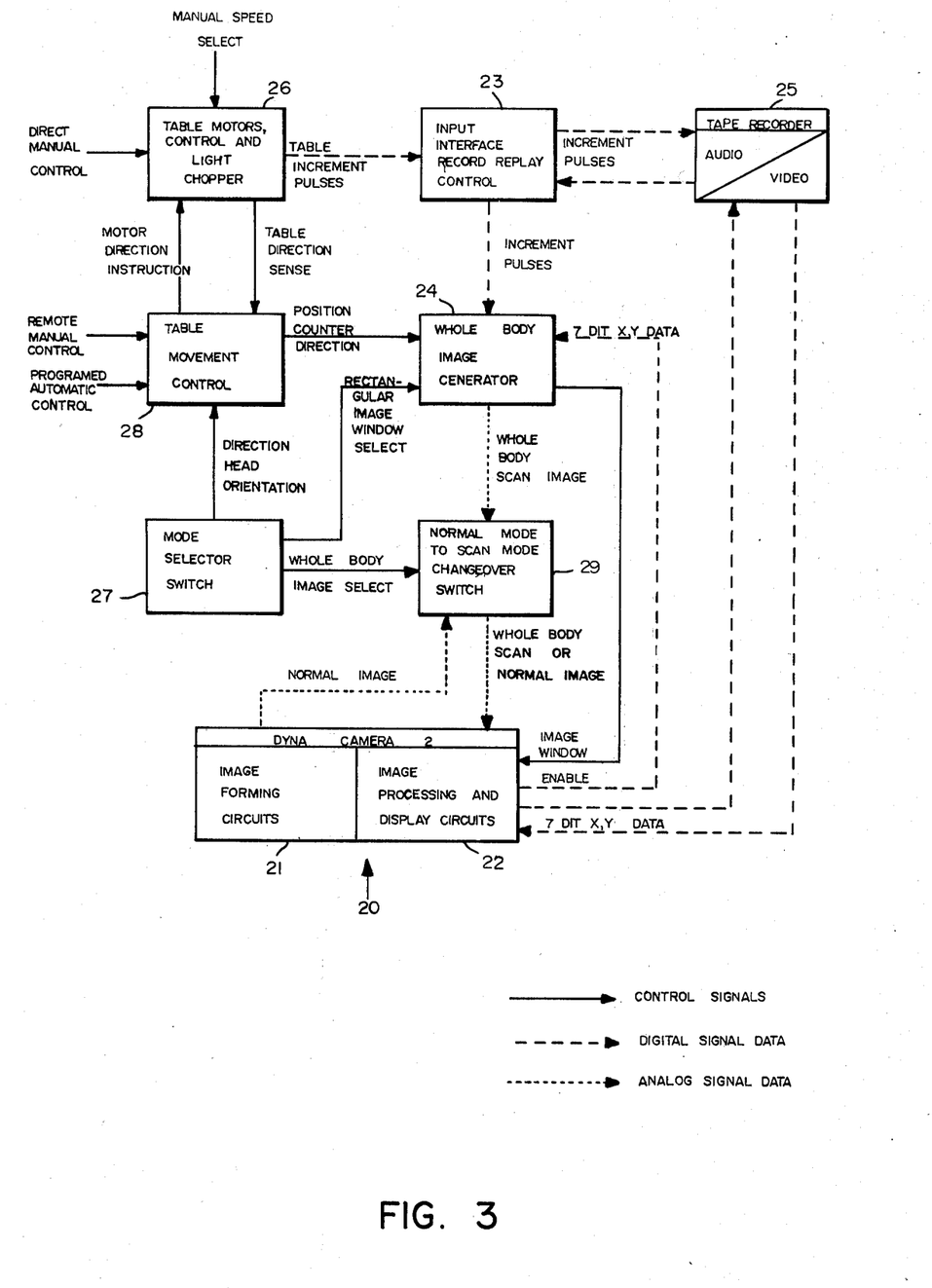
FIG. 3 is a block diagram showing the electronic interface between the scanning table and the scintillation camera.

Referring now to FIG. 3, the interfacing problem is made relatively simple by the fact that the Dynacamera circuitry, denoted generally at 20, the essentially divided into two parts, the Image Forming Section 21 and the Image Processing Section 22.

The Image Forming Section 21 generates two seven bit binary numbers representing a scintillation event at co-ordinates $x_i$ and $y_j$ respectively. These binary numbers are available in parallel form from a holding register in the Dynacamera both during recording and during replay from tape. The digital $x_i$ and $y_j$ position is subsequently converted to two analog position signals. These analog signals are used for all regular dynacamera processing operations such as image rotation, area of interest selection, generation of count profiles by the data processor and for the production of the photographic image from the display oscilloscope.

The circuit schematic described makes it possible to externally generate the sums $X_a + x_i$ and $Y_b + y_j$ digitally to form $X_i Y_j$ and then to convert these to analog signals whose sense, magnitude and output impedance match those generated within the scintillation camera. These signals are then injected into the scintillation camera in place of the normal $x_i y_j$ analog signals. Hence the processing circuitry operates on analog signals of similar magnitude but carrying more information, potentially that of a whole body image when the full $X_i Y_j$ matrix is displayed on the oscilloscope or when a whole body count profile resolved into 100 points displayed on the data processor.

The data processor is a modified 100 channel analyzer which displays count profiles taken along the x axis of the image display oscilloscope. Rotation of the image relative to this axis enables various profiles to be generated since the multichannel analyzer operates on the x component of the analog position signal after rotation. The x component of any displayed image is divided into 100 intervals and a profile of counts per interval is then displayed on the processor oscilloscope. In clinical terms the longitudinal count profile of a whole body scan may be examined at any level as a transverse count profile. Therefore, two overlapping organs in longitudinal profile, e.g. liver and spleen which are seen as a single integrated peak, may be differentiated in transverse profile and individual organ activity defined by integration of the two peaks.

Smaller sections of the whole body can be amplified and displayed in greater detail on subsequent replay from tape. This is achieved by application of a backing off signal to bring the region of interest to the center of the display and then amplifying the image about this point. The profile obtained on the data processor corresponds to the amplified section of the image displayed. If the image size obtained in normal static use is regarded as having a magnification of S then the whole body can be imaged at a scale reduction factor of S/6 relative to this and can be displayed across the face of the oscilloscope.

Digital logic level pulses generated from a light chopper or sequencer 26 on the X and Y drive motors are received by line receivers at the Input Interface 23. In each case a 1 msec pulse generated from the leading edge is routed to the Whole Body Image Generator 24 and to one of the respective two audio tracks of the Videotape Recorder 25 used with the Dynacamera 20. Thus the pulses which generate the $X_a$ $Y_b$ position of the table are simultaneously recorded together with the $x_i$ $y_j$ coordinates from the camera detector. During replay the position pulses are returned to the Input Interface 23 through line receivers and are switched to the Whole Body Image Generator 24 in place of the real time pulses. Switching functions are performed by digital logic.

The Whole Body Image Generator 24 performs four functions:
 1. rejection of those image points falling outside the 60×60 matrix point central square of the regular digital image;
 2. accumulation of the incremental pulses direct from the table or replayed from tape to form the two 10 bit binary numbers representing $X_a$ and $Y_b$;
 3. formation of $X_i$ $Y_j$ by generating the digital sums $X_a + x_i$ and $Y_b + y_j$; and
 4. digital to analog conversion of $X_i$ and $Y_j$ followed by an image manipulation amplifier to produce an analog signal compatible with that used in the Dynacamera in its 'NORMAL' or digitally generated image mode of use.

The 60×60 point region in the center of the digital image matrix is selected by the use of digital comparators to select an upper and lower level for $x_i$ and $y_j$. A "reject" signal is generated for all points falling outside the area, this is combined with the existing "Area of Interest" circuitry of the Dynacamera so that only points originating within the 60×60 region are displayed. Since the area of interest is normally only visualized on the monitor persistence oscilloscope a minor modification is required to make it also effective on the photographed oscilloscope. 5-bit digital comparators are used to delineate each limit. Digital rather than analog comparators are used to enable the transverse increment of the table required between adjacent scan strips to be more exactly and reproducibly determined.

The table position $X_a$ $Y_b$ is generated by counting successive increments into a synchronous binary up-/down counter. Three binary hexadecimal counters are used for each axis. The appropriate count direction is generated by the Mode Selector Switch 27 and Table Movement Control 28 circuitry. The counters are zeroed at an origin such that the counters will count up as they move off the origin.

The digital sums, $X_a + x_i$ and $Y_b + y$, are formed in two 10-bit full adders. Digital to analog conversion is performed by two D/A converters and summing amplifiers.

The basic gain of the summing amplifier is set so that a 1.8 m (6 ft) patient is imaged in the same diameter on the oscilloscope as the regular 30 cm diameter field of the detector in normal static use. This represents a minification of S/6. Four other switched values of gain are available which provide image scale reduction factors of S/4, S/2, 3S/4, where S is the size normally seen by the scintillation camera in its static mode.

The summing point of the amplifier has five inputs including
 1. the currring source output of the D/A converter;
 2. a constant backoff voltage applied through a summing resistor to produce a symmetrically bipolar image signal in which the center of the image is represented by zero volts at the output of the amplifier for electronically mashing the circular camera crystal to a rectangular shape;
 3. a switched backoff voltage applied through a summing resistor to enable any point of the whole body matrix at 50 matrix point intervals to be made to correspond to zero volts at the output of the amplifier, i.e. the center of the displayed image, for zeroing the device at an arbitrary starting point;
 4. a continuous fine backoff voltage to fill in the intervals provided by (3) above for taking into account possible zeroing error; and
 5. an image smoothing signal derived from the Dynacamera and scaled to give the same degree of smoothing at gain S as is obtained in normal static use for matching impedances. This is only necessary at the 1 and ¾ scale presentation, since at one-half scale the matrix points begin to merge sufficiently to make additional smoothing unnecessary.

The Table Movement Control 28 enables the table to be controlled remotely by manual switching or by an automatic program controller. It also generates a direction signal to the bi-directional counters of the image generator. Counter direction is determined by the direction of movement of the table which is modified by the settng of the Mode Control Switch 29 in the case of the X counter, since inversion of the head involves reversal of its x axis relative to the motion of the table.

The Mode Control Switch 29 is used to switch the Dynacamera from its normal static mode to the scanning mode. It also indicates to the table direction logic whether the camera head is above or below the patient. The changeover from static to normal mode is accomplished by miniature changeover relays in the Dynacamera console which switch in the whole body analog data in place of the regular signal to the signal processing section and enable the image square to be defined on the photographed oscilloscope.

During replay it is necessary to reproduce the correct direction instructions to the bi-directional counters. This may be done manually by monitoring the relayed position pulses on a display counter and operating the manual direction switches, however this limits scan patterns to fairly simple cases for practical reasons.

If an automatic controller is used the whole scan pattern may be generated from a program preset on thumbwheel switches. Scan limits, imcrements between strips and the total number of strips may be preset; and the scan pattern can be repeated up to nine times for increased exposure. Of course, the scan direction may be selected for the X or Y axis with the exposure of the film being started and stopped at the required points. The whole procedure once started is completely automatic and requires no further attention from the operator. Therefore, if an image is replayed from tape and the same control settings are used as in the original scan, once started the replay may be left to run unattended.

The data contained in any one image point may be generated by scintillation events occurring in one or several positions in the detector crystal depending on the exposure schemes selected. In the normal static mode of imaging each image point is generated from scintillations occurring in one small region of the detector crystal, the image resulting from a flood field source is non-uniform. If a whole body image is generated by a series of static images electronically abutted then each image has now uniformity within itself and if opposite edges of the image square have different uniformity response than a discontinuity in intensity will occur at the boundaries of the static images.

Continued scanning in one direction results in each image point being generated by a continuous line across the crystal in the direction of scan, resulting in a uniformity correction along that line. The whole body may be imaged by scanning a series of adjacent strips in which case there is no uniformity correction at right angles to the direction of scan. A useful degree of uniformity correction can be introduced by overlapping successive strips. After each continously scanned strip the bed may be incremented 30, 20 or 15 increments at right angles to the scan axis instead of the 60 increments used for adjacent strips. The scan speed may be increased by a factor of 2, 3 or 4 respectively to preserve the same exposure time. Each point in the final image may be generated by 2, 3 or 4 equispaced lines across the crystal face parallel to the direction of scan. Uniformity is considerably improved when four lines are used and approaches that of the continuous scan.

Figure 4:
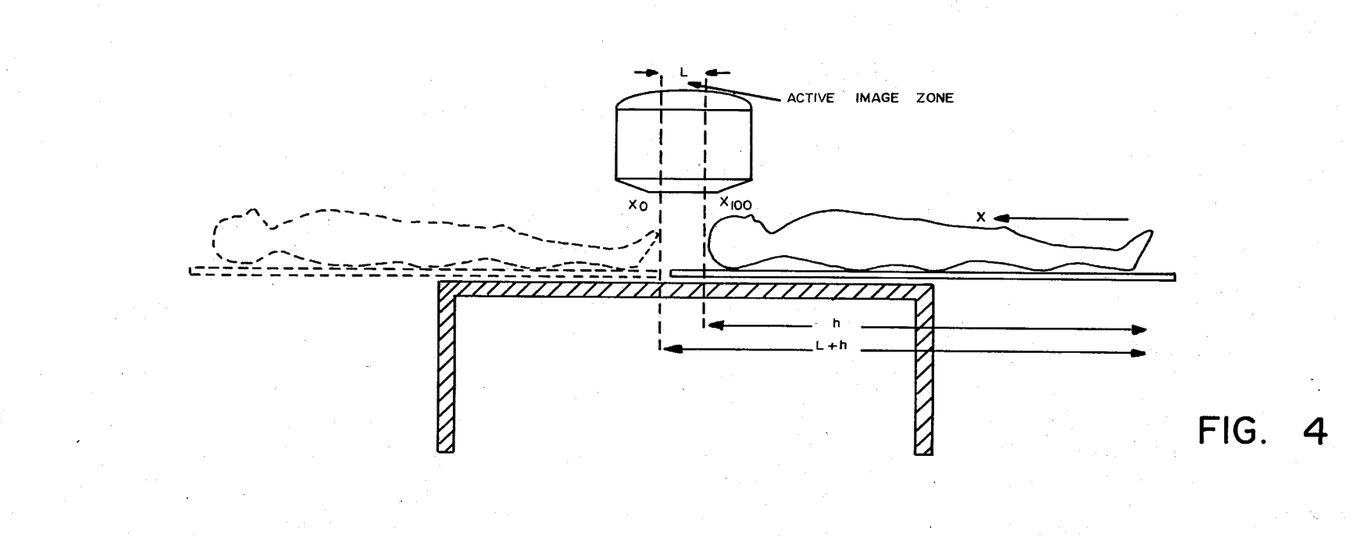
FIG. 4 is an elevational schematic view of the scanning table with the scintillation camera located above illustrating the longitudinal transverse $(L + h)$ required to fully image a patient of height h using an active image zone of width L.

Referring now to FIG. 4, assume a patient of length h is passed once under the camera detector head whose imaging area is restricted to a square of side L thus generating an image of a strip of width L. In order to image the whole length h of the patient completely, the patient must be moved a total distance of L + h.

Figure 5:
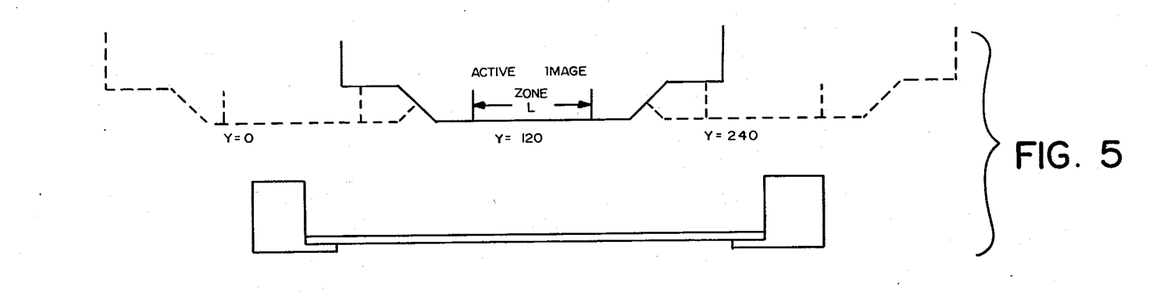
FIG. 5 is a transverse sectional view of the scanning table with the scintillation camera positioned above.
Figure 6:
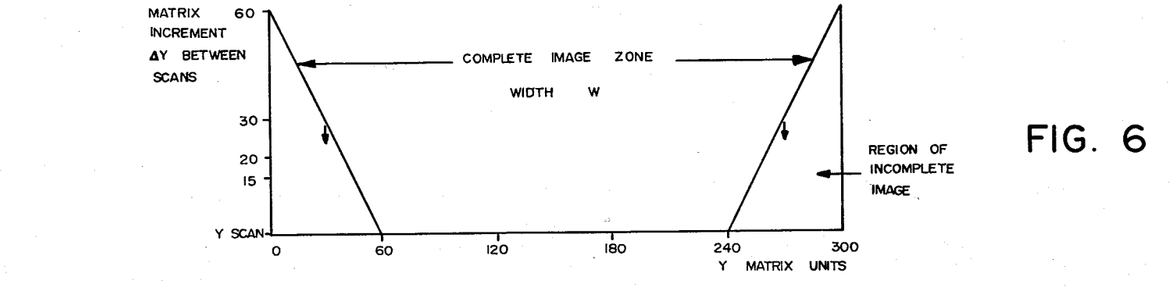
FIG. 6 is a graph showing the relationship between the width of the complete imaging zone and the increment $\Delta Y$ between successive longitudinal scan strips.
Figure 7:
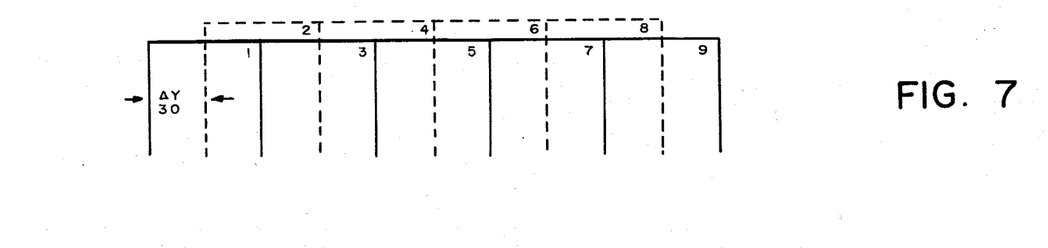
FIG. 7 is a plan view of the pattern of overlapping scan strips for the case where $\Delta Y = 30$.

Referring now to FIGS. 5 to 7, a whole body image is formed by combining several X scan strips. These may be abutted or overlapped as indicated above. Simple abutting with no overlap results in the most rapid total scan time. Overlapping means that at each side of the total scan there is a region of partial image formation which must lie outside the area of interest.

FIG. 5 illustrates the transverse section of the scanning table with the camera head positioned above the patient. The limiting positions of the camera head relative to the table are shown in broken lines. The graph shown in FIG. 6 whose abscissa is on the same scale as the table section shows the maximum width within which a complete image is formed for all possible values of the increment $\Delta Y$ between successive X scan strips. FIG. 7 shows a plan view of an overlapping pattern of successive scan strips for the case where $\Delta Y = 30$.

A variety of overlap schemes may be selected depending on whether uniformity or speed is more important. The maximum Y traverse of a table of just over 240 matrix points gives a minimum usable width of 180 matrix points 3L, equal to 54 cm. (21 inches). Similarly, when the table is used in the Y scan mode, $\Delta x$ may be incremented between scans to increase the image area. FIG. 5 illustrates the limiting situation where $\Delta Y = 0$. The resulting maximum usable width available when the table is used in the X scan mode and adjacent strips are abutted without overlap is 5L. As shown by the broken lines in FIG. 7, the overlapping of successive scan strips results in reduction of the fully imaged usable width.

In the operation of the present invention the patient is moved continuously under or over the camera face along one axis at a time. Parallel passes are made to increase the dimension of the other axis. Each increment of 3 mm in either axis moves the matrix display by one point in the corresponding axis and direction on the oscilloscope display. To insure uniformity in the final image, the image producing area is masked to a rectangular shape as shown by the broken square in FIG. 1. This is accomplished electronically without any need to mask the crystal. While the side of the inscribed square of a circle 100 maxtrix points diameter is 70 matrix points, in practice a square of side 60 matrix points is used for scanning to eliminate edge distortion. This corresponds to a useful image producing zone of 18 cm (7 inches) square in the crystal and represents 46% of the useful area of a 30 cm. (12 inches) diameter crystal or the equivalent area of a 20.3 cm. (8 inch) diameter crystal.

The whole body image may be created by a number of suitable exposure schemes of the object to the detector crystal. These schemes may vary from complex scanning patterns in which each part of the image receives successive contributions from different points of the crystal resulting in a degree of uniformity correction to a series of static exposures joined together, the electronic equivalent of pasting together a series of photographs taken from regular camera images.

The relative merits of different exposure schemes and the uniformity improvements produced are discussed later. The hardware required to generate the image is identical in every case. Again, the basic requirements are that the patient be moved above or below the detector head in such a way that his position at any time may be expressed as the two coordinates $X_a$ and $X_b$, and that all parts of the body are exposed to some part of the detector crystal for an equal length of time.

The patient is constrained by any suitable body immobilizer on a thin foam pad which adds another 1 cm onto the distance separating the detector head from the body surface of a supine patient when the camera is mounted below the patient. Movement of the scanning table is monitored by a light sequencer mounted directly on the drive shaft of each motor. Each time the table advances by 3 mm corresponding to one image point separation in the final display a phototransistor is activated to generate a pulse. This pulse is shaped and routed into a bi-directional counter in the interface electronics thereby generating the position coordinates $X_a Y_b$ relative to an origin which is one of the extreme positions of the table.

The position pulse for each axis is also stored respectively on the two audio channels of the Sony Videotape Recorder used by the Dynacamera to store the coordinates $X_i Y_j$ of each scintillation event. Replay of the stored pulses into the bi-directional counters generates $X_a Y_b$ in the correct time relationship to $x_i y_j$ thus permitting regeneration of the whole body image. A simple modification would enable position pulses to be stored on a single audio channel if necessary.

The drive for the two directions of motion is provided by two DC motors used in conjunction with a controller. The controller provides a forward, reverse and brake control together with a variable speed control. DC motors rather than stepping motors were selected to obtain maximum torque in the smallest volume and at low cost.

Each controller has been modified for remote control by replacing each Forward/Brake/Reverse Switch with two relays. Activation of the appropriate relay causes forward or reverse motion; when both are inactive the motor is in the brake condition. The table may be operated remotely and automatically by a four line drive signal to these relays to control the four movements and braking. Alternatively the relays may be activated by a hand-held pushbutton control box on an extension lead from the table. This feature facilitates positioning of the patient and enables the table to be used independently of interface and control electronics if desired. For this purpose an extra set of contacts on each control relay is used to provide a signal indicating the direction of motion of the table.

Clinical application of the described system for whole body or large area scanning has been made in Laennec's cirrhosis, rheumatoid arthritis and in defining the kinetics of cerebrospinal fluid movement. Such applications include the intravenous injection of 99 mm. Technetium Sulfur colloid which is quickly cleared from the blood and deposited in the reticuloendothelial system. The distribution in the liver, spleen and bone marrow may then be defined in the normal subject by a digital whole body scan matrix.

Numerous projected applications are envisioned, as exemplified by whole body distribution studies of radiopharmaceuticals. This information would be enhanced by total whole body counting. Other applications are anticipated in bone and bone marrow scanning and the grading of Hodgkins's disease with 67 Gallium.

It should be noted that while the system has the capability to image and profile the whole body there are also many applications in which examination of a smaller extended area can provide sufficient information, resulting in a corresponding reduction in total scan time.

Also, it has been indicated above that image uniformity is improved when several points on the crystal contribute to each point in the final image. This uniformity improvement is greatest along the line of scanning. However, the improvement in uniformity is accompanied by a loss of resolution from two causes. While the scan is continuous the matrix is only incremented every 3 mm; this contributes a small uncertainty in position. This is negligible since the main interest is in examining distribution of isotope over extended areas. A more important contribution to loss of resolution is the non-linearity within the central image forming square. Different regions in the image forming square will place their contributions to the same part of the image in slightly different locations in the final matrix. This causes loss of resolution in the final image in the direction of scan at points where there is appreciable change in linearity across the image forming square, such as the opposite sides of a barrel distortion. While there may be advantages in setting up the scintillation camera to optimize on linearity at the expense of uniformity no attempt to do this has been made since the aim of the scanning modification is to avoid any alteration of the existing normal functioning of the camera.

It is to be understood that the phraselogy or terminology employed herein is for the purposes of description and not of limitation.

The foregoing description of the specific embodiment will so fully reveal the general nature of the invention that others can, by applying current knowledge, readily modify such specific embodiment and/or adapt it for various applications without departing from the generic concept, and, therefore, such adaptations and modifications should and are intended to be comprehended within the meaning and range of equivalents of the disclosed embodiment.

What is claimed is:

1. A system for producing information on the distribution of a source of radiation in an object that can be displayed in image form or in count profile form, said system comprising a scintillation camera having a scintillation detector, a radiation shield and a data processing mechanism; said scintillation camera representing a scintillation event as a first set of coordinates in terms of a first set of signals; means for supporting thereon an object having a source of radiation therein; motor mechanism for providing relative movement of extended linear dimension along both the X and Y axes between said scintillation detector and said support means, the extended linear dimension along both the X and Y axes being substantially greater than the dimensions of said scintillation detector in both the X and Y direction to enable substantially the entire support means to be scanned by said scintillation camera; mechanism for indicating relative movement between said support means and said scintillation detector and for producing a signal in response thereto; and electronic interfacing means coupled to said scintillation detector and to said data processing mechanism and to said movement indicating mechanism for electronically masking said scintillation camera into a predetermined shape for converting the signal from said movement indicating mechanism to a second set of coordinates and for summing the first set of coordinates and the second set of coordinates and converting the sum into a second set of signals and for replacing the first set of signals with the second set of signals, continued relative movement between said scintillation detector and said support means with the object thereon resulting in n sets of signals over extended linear dimensions along both the X and Y axes summed before display to correct non-uniformity, non-linearity and edge distortion in said scintillation detector, whereby the n sets of signals received by said data processing mechanism are displayed in image form or in count profile form.

2. A method for producing information on the distribution of a source of radiation in an object comprising providing a scintillation camera having a scintillation detector, a radiation shield, a data processing mechanism and a display device capable of representing a scintillation event as a first set of coordinates in terms of a first set of signals; electronically masking the scintillation detector into a predetermined shape; providing relative and extended linear movement along both the X and Y axes between an object having the souce of radiation therein and the scintillation detector to enable the entire object to be scanned by the scintillation detector; producing a signal indicating the relative position of the object being scanned and the scintillation detector; electronically converting the signal indicating the relative position of the object being scanned and the scintillation detector into a second set of coordinates and summing the first set of coordinates and the second set of coordinates and converting the sum into a second set of signals; and electronically replacing the first set of signals with the second set of signals and continuing the operation to produce n sets of signals and transmitting the signals to the display device for display thereby in image form or in count profile form.

3. A system for producing information on the distribution of a source of radiation through an object that can be displayed in image form or in count profiling form, said system comprising a scintillation camera having a scintillation detector, a radiation shield and a data processing mechanism, said scintillation camera repesenting a scintillation event as a first set of coordinates in terms of a first set of signals, means for supporting thereon an object having a source of radiation therein, motor mechanism for providing relative movement of extended linear dimension along one of the X and Y axes between said scintillation detector and said support means, the extended linear dimension along the one of the X and the Y axes being substantially greater than the dimensions of said scintillation detector in the one of the X and the Y directions to enable substantially the entire support means to be scanned in the one direction by said scintillation camera, mechanism for indicating relative movement between said support means and said scintillation detector and for producing a signal in response thereto; and electronic interfacing means coupled to said scintillation detector and to said data processing mechanism and to said movement indicating mechanism for electronically masking said scintillation camera into a predetermined shape for converting the signal from said movement indicating mechanism to a second set of coordinates and for summing the first set of coordinates and the second set of coordinates and converting the sum into a second set of signals and for replacing the first set of signals with the second set of signals, continued relative movement between said scintillation detector and said support means with the object thereon resulting in n sets of signals over extended linear dimensions along one of the X and Y axes summed before display to correct non-uniformity, non-linearity and edge distortion in said scintillation detector, whereby the n sets of signals received by said data processing mechanism are displayed in image form or in count profile form.

4. The system set forth in claim 3, wherein the first set of coordinates is represented in a fixed reference frame as analog signals.

5. The system set forth in claim 3, wherein the second set of coordinates is represented in a moving reference frame.

6. The system set forth in claim 3, wherein the first set of coordinates is expressed as a first set of analog signals and the second set of signals is expressed as a second set of analog signals, wherein the sense, magnitude and output impedance of the second set of signals match those of the first set of signals.

7. The system set forth in claim 3, wherein the electronic interface means digitally generates the sum of the first set of signals and the second set of signals.

8. The system set forth in claim 3, wherein said scintillation camera is stationary and said motor mechanism moves said support means.

9. The system set forth in claim 3, and further comprising means for electronically synchronizing said electronic interface means with the relative movement between said scintillation detector and said support means.

10. The system set forth in claim 3, wherein said scintillation camera is positioned below said support means.

11. A system for use with a scintillation camera including a scintillation detector, a radiation shield, a data processing mechanism and a display device for producing information on the distribution of a source of radiation through an object, the scintillation event being represented as a first set of coordinates in terms of a first signal that can be displayed on the display device in image form or in count profile form, said system comprising means for supporting thereon an object having a source of radiation therein, motor mechanism for providing relative movement of extended linear dimension along one of the X and Y axes between the scintillation detector and said support means, the extended linear dimension along one of the X and the Y axes being substantially greater than the dimensions of the scintillation detector in one of the X and the Y directions to enable substantially the entire support means to be scanned in the one direction by the scintillation camera, mechanism for indicating relative movement between said support means and the scintillation detector and for producing a signal in response thereto; and electronic interfacing means coupled to the scintillation detector and to the data processing mechanism and to said movement indicating mechanism for electronically masking the scintillation camera into a predetermined shape for converting the signal from said movement indicating mechanism to a second set of coordinates and for summing the first set of coordinates and the second set of coordinates and converting the sum into a second set of signals and for replacing the first set of signals with the second set of signals, continued relative movement between the scintillation detector and said support means with the object thereon resulting in n sets of signals over extended linear dimensions along one of the X and the Y axes summed before display to correct non-uniformity, non-linearity and edge distortion in the scintillation detector, whereby the n sets of signals received by the data processing mechanism are displayed on the display device in image form or in count profile form.

12. A system for producing information on the distribution of a source of radiation in an object in digital form, said system comprising a scintillation camera having a scintillation detector, a radiation shield and a data processing mechanism, said scintillation camera representing a scintillation event as a first set of coordinates in terms of a first set of signals, means for supporting thereon an object having a source of radiation therein, motor mechanism for providing relative movement of extended linear dimension along one of the X and Y axes between said scintillation detector and said support means, the extended linear dimension along the one of the X and Y axes being substantially greater than the dimensions of said scintillation detector in the one of the X and the Y direction to enable substantially the entire support means to be scanned in the one direction by said scintillation camera; mechanism for indicating relative movement between said support means and said scintillation detector and for producing a signal in response thereto; and electronic interfacing means coupled to said scintillation detector and to said data processing mechanism and to said movement indicating mechanism for electronically masking said scintillation camera into a predetermined shape for converting the signal from said movement indicating mechanism to a second set of coordinates and for summing the first set of coordinates and the second set of coordinates and converting the sum into a second set of signals and for replacing the first set of signals with the second set of signals, continued relative movement between said scintillation detector and said support means with the object thereon resulting in n sets of signals over extended linear dimensions along the one of the X and the Y axes summed to correct non-uniformity, non-linearity and edge distortion in said scintillation detector, the n sets of signals received by said data processing mechanism being displayed in digital form.

13. A system for use with a scintillation camera including a scintillation detector, a radiation shield and a data processing mechanism, the scintillation event being represented as a first set of coordinates in terms of a first signal that can be produced from the data processing mechanism in digital form, said system comprising means for supporting thereon an object having a source of radiation therein; motor mechanism for providing a relative movement of extended linear dimension along one of the X and the Y axes between the scintillation detector and said support means, the extended linear dimension along the one of the X and the Y axes being substantially greater than the dimensions of the scintillation detector in the one of the X and the Y direction to enable substantially the entire support means to be scanned in the one direction by the scintillation camera, mechanism for indicating relative movement between said support means and the scintillation detector and for producing a signal in response thereto; and electronic interfacing means coupled to the scintillation detector and to the data processing mechanism and to said movement indicating mechanism for electronically masking the scintillation camera into a predetermined shape for converting the signal from said movement indicating mechanism to a second set of coordinates and for summing the first set of coordinates and the second set of coordinates and converting the sum into a second set of signals and for replacing the first set of signals with the second set of signals, continued relative movement between the scintillation detector and said support means with the object thereon resulting in n sets of signals over extended linear dimensions along the one of the X and the Y axes summed to correct non-uniformity, non-linearity and edge distortion in the scintillation detector, whereby the n sets of signals received by the data processing mechanism are produced in digital form.

14. A method for producing information on the distribution of a source of radiation in an object comprising providing a scintillation camera having a scintillation detector, a radiation shield and a data processing mechanism capable of representing a scintillation event as a first set of coordinates in terms of a first set of signals; electronically masking the scintillation camera into a predetermined shape, providing relative and extended linear movement along one of the X and the Y axes between an object having the source of radiation therein and the scintillation detector to enable the entire object to be scanned along the one axis by the scintillation detector; producing a signal indicating the relative position of the object being scanned and the scintillation detector, electronically converting the signal indicating the relative position of the object being scanned and the scintillation detector into a second set of coordinates and summing the first set of coordinates and the second set of coordinates and converting the sum into a second set of signals, and electronically replacing the first set of signals with the second set of signals and continuing the operation to produce n sets of signals and transmitting the signals to the data processing mechanism for production thereby in digital form.

15. A method for producing information on the distribution of a source of radiation through an object comprising providing a scintillation camera having a scintillation detector, a radiation shield, a data processing mechanism and a display device capable of representing a scintillation event as a first set of coordinates in terms of a first set of signals, electronically masking the scintillation camera into a predetermined shape, providing relative and extended linear movement along one of the X and Y axes between an object having a source of radiation therein and the scintillation detector to enable the entire object to be scanned along the one axis by the scintillation detector, producing a signal indicating the relative position of the object being scanned and the scintillation detector, electronically converting the signal indicating the relative position of the object being scanned and the scintillation detector into a second set of coordinates and summing the first set of coordinates and the second set of coordinates and converting the sum into a second set of signals, and electronically replacing the first set of signals with the second set of signals and continuing the operation to produce n sets of signals and transmitting the signals to the display device for display thereby in image form or in count profile form.

16. The method set forth in claim 15, wherein the scintillation camera is stationary and the object is moved with respect thereto.

17. The method set forth in claim 15, wherein the object is positioned above the scintillation camera.

18. The method set forth in claim 15, wherein the first set of signals and the second set of signals are analog.

19. The method set forth in claim 15, wherein the first set of coordinates and the second set of coordinates are summed digitally.

* * * * *